Patented June 24, 1930

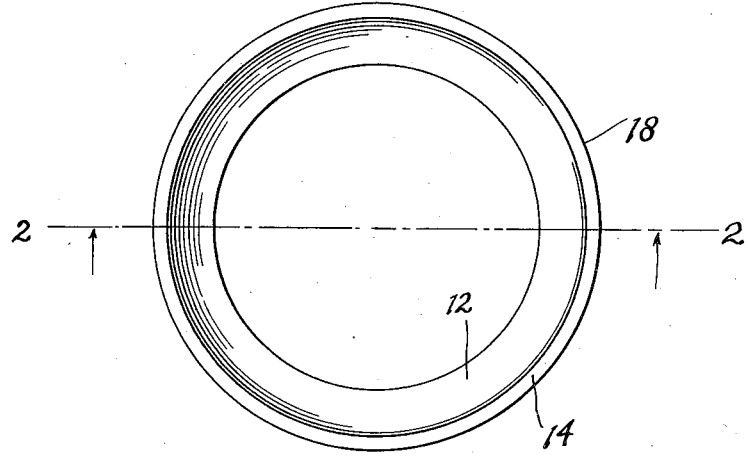
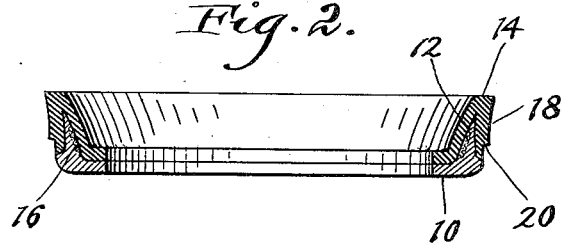
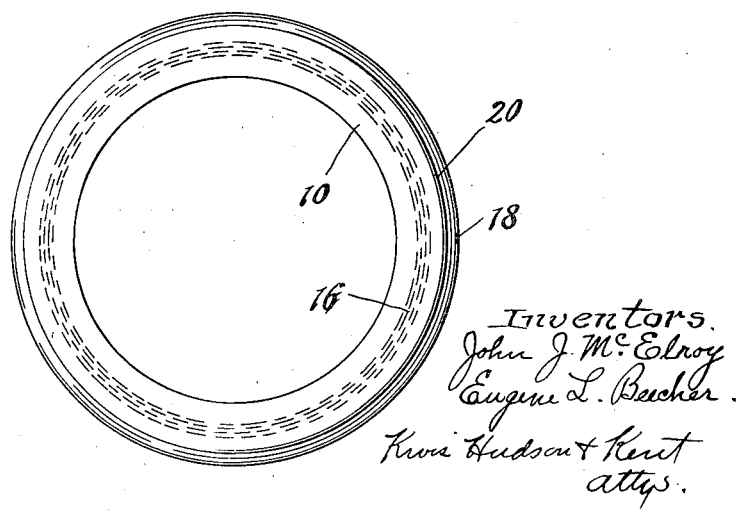

1,767,936

UNITED STATES PATENT OFFICE

JOHN J. McELROY AND EUGENE L. BEECHER, OF NEW HAVEN, CONNECTICUT, ASSIGNORS, BY MESNE ASSIGNMENTS, TO THE CLEVELAND PNEUMATIC TOOL COMPANY, OF CLEVELAND, OHIO, A CORPORATION OF OHIO

CUP WASHER

Application filed June 9, 1926. Serial No. 114,867.

This invention pertains to cup washers of the type used in connection with reciprocating plungers in pumps or other machines for handling or controlling fluids such as air, water, or oil.

The invention finds particular utility in such devices as air springs for vehicles, of the type disclosed in application Serial No. 23,173, filed April 15, 1925, by John J. McElroy.

In that application are shown cup washers of the usual type in which expander rings are provided inside the vertical walls of the washer to keep them in proper contact with the cylinder walls. Such construction is objectionable because it is expensive and because adjustment is required from time to time as the washer wears.

Attempts have been made to avoid the necessity for expander rings by making the washers of stiff material such as hard rubber, but such washers have not been satisfactory because they frequently crack or break at the heel, because the hard rubber has a high frictional resistance on the metal of the cylinders, and because the hard rubber scores the cylinders, thereby increasing friction and leakage and requiring repairs. It is also rather difficult to insure a tight joint between cylinder and washer because of the stiffness of the latter which tends to prevent the washer adapting itself readily to any irregularities or out-of-round conditions of the cylinder.

The most suitable material yet found for the washer is soft rubber, especially rubber in which lubricating material is incorporated, as it conforms readily to the shape of the cylinder, does not score the cylinder, offers greatly reduced frictional resistance to sliding in the cylinder, and, on account of its elasticity it tends to automatically take up wear.

An object of the present invention is to provide a washer having soft rubber adjacent to, and in contact with, the cylinder walls, and which does not require an expansion ring.

Another object is to provide a cup washer with a stiff body portion and soft wall portion.

Another object is to provide a soft rubber washer with internal reinforcement.

Another object is to provide a washer having a reinforced heel to prevent cracking and breakage at the heel.

Another object is to provide a design which will prevent distortion of the working edge when the cup is clamped in position.

Another object is to provide a cup washer with a working edge having lubricating qualities.

Further and other objects and advantages will be hereinafter set forth in the accompanying specification and claims and shown in the drawings, which by way of illustration show what is now considered to be the preferred embodiment of the invention.

Fig. 1 is a top view of the washer.
Fig. 2 is a section on line 2—2 of Fig. 1.
Fig. 3 is a bottom view of the washer.

The construction of the washer in its preferred form may best be understood from Fig. 2, in which a ring-shaped heel or base 10 is provided having an upwardly projecting rim portion 12. Molded around the rim and upper portion of the heel is the comparatively soft cap or envelope 14, substantially as shown.

The heel 12 may be made of wood, metal, hard rubber, bakelite or any similar substance, but we prefer to use a semi-hard rubber, thus providing considerable resiliency in the upper portion of the rim and helping to keep the soft envelope 14 in proper position.

A further advantage of the semi-hard rubber heel is the fact that with such material it is not so difficult to obtain and maintain adhesion between the heel and the envelope.

When the heel is made of semi-hard rubber, we mold into it the circumferential wires or wire screen 16 which serve to reinforce the ring and prevent cracking at the heel in service.

The only portion of the washer that comes in contact with the cylinder is the working surface 18 of the envelope. Surface 18 is cut away or relieved at 20, and the diameter of the heel is appreciably less than the diameter of the cylinder, thus preventing the material of the heel from being distorted up against the working surface, and preventing the working surface from being distorted down over the heel.

The washer is held in operative position by clamping devices applied to the horizontal inner ring portions of heel 10 and envelope 14.

We prefer to make the envelope 14 of soft rubber, especially rubber which has lubricating material incorporated in it whereby friction and wear between working surface 18 and the cylinder are greatly reduced. Surface 18 is usually flared outwardly as shown, so as to aid in maintaining close contact against the cylinder when the washer operates therein.

It is to be understood that the invention is not limited to the specific construction and details herein illustrated but can be embodied in other forms without departure from its spirit.

We claim—

1. A cup washer structure for operation in a cylinder comprising, in combination, a ring-shaped heel with an upstanding rim, and an envelope of different material formed integral therewith, said heel being formed of hard material to provide stiffness to the structure, and said envelope being formed of soft rubber to provide an advantageous working surface on the cylinder.

2. A cup washer structure for opertion in a cylinder, comprising in combination, a ring-shaped heel of comparatively hard material to provide stiffness to said structure, reinforcing material integral with said heel, and an outer envelope of soft rubber to provide a working surface on said cylinder.

3. A cup washer structure for operation in a cylinder, comprising in combination, a heel having an upstanding ring of comparatively hard material to provide stiffness to said structure, reinforcing material integral with said ring at the inner surface thereof, and an envelope of rubber integral with said ring on the outer surface thereof to provide a working surface on said cylinder.

4. A cup washer structure for operation in a cylinder, comprising in combination, a comparatively hard body portion to provide stiffness to said structure, and a peripheral envelope formed integrally with said body portion, said envelope being formed of soft rubber having lubricating agents incorporated therein to reduce friction between the working surface of said envelope and the cylinder.

In testimony whereof we hereto affix our signatures.

JOHN J. McELROY.
EUGENE L. BEECHER.